United States Patent
Latil

(10) Patent No.: US 12,281,920 B2
(45) Date of Patent: Apr. 22, 2025

(54) ROTOR SYSTEM FOR MEASURING THE FLOW RATE OF A FLUID COMPRISING A LIQUID, AND ASSOCIATED EQUIPMENT

(71) Applicant: COMMISSARIAT A L'ENERGIE ATOMIQUE ET AUX ENERGIES ALTERNATIVES, Paris (FR)

(72) Inventor: Philippe Latil, Pertuis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 276 days.

(21) Appl. No.: 18/005,289

(22) PCT Filed: Jul. 13, 2021

(86) PCT No.: PCT/EP2021/069505
§ 371 (c)(1),
(2) Date: Jan. 12, 2023

(87) PCT Pub. No.: WO2022/013241
PCT Pub. Date: Jan. 20, 2022

(65) Prior Publication Data
US 2023/0258486 A1    Aug. 17, 2023

(30) Foreign Application Priority Data
Jul. 17, 2020    (FR) .................................... 20 07554

(51) Int. Cl.
*G01F 1/10*    (2006.01)
*G01F 15/02*    (2006.01)

(52) U.S. Cl.
CPC .............. *G01F 1/103* (2013.01); *G01F 15/02* (2013.01)

(58) Field of Classification Search
CPC ................................. G01F 1/103; G01F 15/02
See application file for complete search history.

(56) References Cited

U.S. PATENT DOCUMENTS

| | | | |
|---|---|---|---|
| 3,217,539 A | 11/1965 | Owen et al. | |
| 3,788,285 A | 1/1974 | Gelin et al. | |
| (Continued) | | | |

FOREIGN PATENT DOCUMENTS

| | | |
|---|---|---|
| EP | 0 769 681 A2 | 4/1997 |
| FR | 2.222.638 | 10/1974 |
| (Continued) | | |

OTHER PUBLICATIONS

International Search Report and Written Opinion issued Sep. 21, 2021 in PCT/EP2021/069505 filed Jul. 13, 2021, (with English Translation of Cited Documents), 12 pages.

(Continued)

*Primary Examiner* — Paul M. West
(74) *Attorney, Agent, or Firm* — Oblon, McClelland, Maier & Neustadt, L.L.P.

(57) ABSTRACT

A system for measuring a flow rate of a fluid containing liquid includes a body in which the fluid flows, at least one rotor configured to be rotated by the fluid, and a device for measuring a rotation speed of the rotor. The measuring device includes an optical module configured to transmit an incident light radiation on vanes of the rotor, in a direction substantially perpendicular to an axis of rotation of the rotor and receive a reflected light radiation coming from the vanes. The measuring device further includes a conversion module configured to determine the rotation speed of the rotor according to the reflected light radiation and determine the flow rate of the fluid.

17 Claims, 6 Drawing Sheets

(56) References Cited

U.S. PATENT DOCUMENTS

| | | | |
|---|---|---|---|
| 4,255,235 A | | 3/1981 | Dubourg |
| 4,428,243 A | * | 1/1984 | Taylor ............... G01F 1/103 |
| | | | 73/861.77 |
| 4,851,666 A | | 7/1989 | Anderson et al. |
| 4,885,943 A | | 12/1989 | Tootell et al. |
| 5,388,466 A | | 2/1995 | Teunissen |
| 2019/0376410 A1 | * | 12/2019 | Schleif ............... F01D 21/003 |
| 2019/0376821 A1 | | 12/2019 | Donzier et al. |

FOREIGN PATENT DOCUMENTS

| | | |
|---|---|---|
| FR | 2 413 757 | 7/1979 |
| FR | 2 988 837 A1 | 10/2013 |
| GB | 752822 A | 7/1956 |
| GB | 2 083 210 | 3/1982 |
| JP | 57-168114 A | 10/1982 |
| JP | 11-64113 A | 3/1999 |
| JP | 2001-194378 A | 7/2001 |
| JP | 2001-235351 A | 8/2001 |
| WO | WO 86/00403 A1 | 1/1986 |
| WO | WO 2019/083701 A2 | 5/2019 |

OTHER PUBLICATIONS

Du, Y. et al., "Theoretical and Experimental Study on Wide Range Optical Fiber Turbine Flow Sensor", Sensors, vol. 16, 1095, 2016, 15 pages.

Gu, Y. et al., "Theory and structure of a modified optical fiber turbine flowmeter", Flow Measurement and Instrumentation, vol. 50, 2016, pp. 178-184.

* cited by examiner

ROTOR SYSTEM FOR MEASURING THE FLOW RATE OF A FLUID COMPRISING A LIQUID, AND ASSOCIATED EQUIPMENT

TECHNICAL FIELD

The present invention relates to the field of systems for measuring the flow rate of a fluid comprising liquid. It has a particularly advantageous application in optically measuring the flow rate of a liquid fluid or fluid comprising liquid for chemistry, pharmacy, agribusiness, petrochemistry, or construction applications.

STATE OF THE ART

Numerous applications demand an accurate and reliable measurement of the flow rate of a fluid. A measurement of the flow rate of a fluid can, for example, be necessary for the correct operation of a method, or for safety inspections. The fields of chemistry, pharmacy, agribusiness, petrochemistry, or also construction can in particular be mentioned.

There are several systems for measuring flow rate, also called flow sensors, to measure the flow rate of a fluid. Certain flow sensors determine the flow rate of the fluid from its pressure, or a variation of its pressure. Pressure differential flow sensors are, for example, configured to limit the flow of the fluid in a conduit and thus create a drop in pressure, for example, by Venturi effect. These flow sensors however lead to load losses and disrupt the flow of the fluid. Pitot tubes can further be mentioned, the accuracy of which is limited if the flow speed of the fluid is low. More generally, flow sensors based on pressure has the disadvantage of being sensitive to uncontrolled variations in pressure of the fluid. Such variations can, for example, occur in a two-phase fluid between a gaseous phase and a vapour phase. Their measuring accuracy is therefore limited.

Other flow sensors use magnetic effects to determine the flow rate of the fluid. For example, Hall effect flow sensors or coupled rotor flow sensors with an electromagnetic detection can be mentioned. These flow sensors are however sensitive to the proximity electromagnetic environment, which limits the accuracy of measuring them. Furthermore, a detection based on a magnetic effect imposes stresses on the constitutive materials of the flow sensor and on the nature of the fluid.

There are flow sensors based on an optical measurement. A system comprising a rotor and a device for optically measuring the rotation speed of the rotor are, in particular, known from document JPH1164113 A. For this, the measuring device is configured to apply a light radiation on the vanes of the rotor, in a direction parallel to the axis of rotation of the rotor. In practice, it has proved to be that this type of flow sensor does not provide a satisfactory accuracy.

U.S. Pat. No. 4,851,666 A1, JPS57168114A, GB2083210 A and U.S. Pat. No. 3,217,539 A1 disclose a system for measuring the speed of a fluid comprising a turbine rotated by the fluid about an axis parallel to the flow direction of the fluid.

FR2222638 A1 describes a flow sensor comprising a bladed rotor mounted horizontally in a casing 1 of the flow sensor.

The accuracy of measurement that these flow sensors provide remains improvable.

There is a need to improve the accuracy of the flow sensors described in the solutions of the state of the art. Another need consists of proposing a flow sensor having a satisfactory accuracy in a severe condition environment, for example in terms of pressure, temperature, nature of a fluid.

For this, an aim of the present invention is therefore a system for measuring the flow rate of a fluid comprising liquid improved with respect to the current solutions.

Other aims, features and advantages of the present invention will appear upon examining the following description and the accompanying drawings. It is understood that other advantages can be incorporated.

SUMMARY

To achieve this aim, according to an embodiment, a system for measuring the flow rate of a fluid comprising liquid is provided, comprising:
  a body comprising at least one inlet, at least one outlet and at least one passage for the flow of the fluid from the inlet to the outlet,
  at least one rotor disposed inside the passage and configured to be rotated, by the flow of the fluid, about an axis,
  a device for measuring a rotation speed of the rotor, the measuring device comprising:
    a module for emitting an incident light radiation,
    an optical module configured to:
      transmit the incident light radiation from the emission module onto the vanes of the rotor, and
      receive a reflected light radiation, the reflected light radiation coming from the reflection, on the vanes of the rotor, of the incident light radiation,
    a conversion module configured to:
      determine the rotation speed of the rotor according to the reflected radiation, and
      determine the flow rate of the fluid according to the rotation speed of the rotor.

Advantageously, the optical module is configured such that the incident light radiation is incident on the vanes of the rotor in a direction substantially perpendicular to the axis of rotation of the rotor.

Preferably, the rotor further comprises a plurality of vanes, at least one vane having a reflection coefficient of the different light radiation, for example less than the reflection coefficient of the light radiation of at least one other vane.

The incident radiation is thus applied radially on the rotor, by the optical module. In the flow direction of the fluid, the bulk of the optical module is therefore reduced with respect to the current solutions. When the fluid flows in the system at the rotor, current line turbulences are induced. The optical module not being disposed in the flow direction of the fluid, but perpendicularly to it, the impact of these turbulences on the optical module are minimised. The accuracy of the measurement of the flow rate is therefore increased with respect to the current solutions.

Furthermore, the optical module not being disposed along the flow of the fluid, this flow is not disrupted by the measurement of the flow rate. However, this arrangement minimises load losses in the flow of the fluid. The impact of the measurement on the flow of the fluid is thus minimised, with respect to the current solutions. The measuring system therefore enables an accurate and reliable measurement of the flow rate of the fluid.

Furthermore, it has proved to be that the proposed system for measuring the flow rate enables an accurate and reliable measurement for inhomogeneous fluids, typically two-phase fluids (fluids comprising liquid and gas or liquid and solid elements) or three-phase fluids (fluids comprising liquid, gas and solid elements). The fields of application of this invention are therefore particularly numerous and varied.

Another solution would have been able to consist of providing applying the incident light radiation radially on a dedicated part, bearing marks enabling these to be read. With respect to this solution, the system proposed by the present invention:
- reduces the disruption of the flow by minimising the bulk of the system in the flow direction of the fluid,
- has a more accurate and reliable measurement of the flow rate,
- has a reduced number of parts. The system is therefore made simpler and more reliable.

Furthermore, the materials of the vanes of the rotor having different reflection coefficients, the light beam has a reflection which is more or less significant according to the material constituting the vanes. The reflected light radiation is therefore modulated according to the vanes on which it is reflected, which facilitates and makes the determination of the number of rotations/time unit of the rotor reliable. The accuracy of the measurement of the flow rate can therefore thus be further improved. This solution clearly stands out from solutions implementing reflective surfaces on each vane of a rotor.

According to an example, the assembly of the at least one vane is made of a material distinct from a material constituting the assembly of the at least one other vane, which has a different reflection coefficient of the light radiation, for example less than the material constituting the at least one other vane. According to an alternative example, at least one vane is coated with a coating different from a coating and/or from a material of the at least one other vane, so as to have a different reflection coefficient of the light radiation, for example less than the material constituting the at least one other vane.

Advantageously, the measuring device can further comprise a module for connecting the optical module to the body. The connection module is configured to establish a fluid seal junction between the optical module and the passage. Thus, the optical module is not in direct contact with the fluid which is sought to measure the flow. The system therefore offers a satisfactory accuracy in a severe condition environment, for example in terms of pressure, temperature, nature of a fluid, and/or irradiating radiation.

Advantageously, the connection module is configured to establish an incident and reflected light radiation sealed and transparent junction.

A second aspect relates to equipment comprising a chamber configured to contain a fluid comprising flowing liquid, and a system for measuring the flow rate of the fluid comprising liquid according to the first aspect. The chamber is delimited by a wall distinct from the body of the measuring system.

According to an example, the chamber is configured to contain a fluid comprising liquid at a pressure less than 200 bar and/or at a temperature less than 350° C. and/or flowing at a flow rate of between 1 and 1000 m$^3$/h, preferably between 1 and 10 m$^3$/h.

According to an example, the chamber is configured to contain a fluid comprising liquid at a pressure less than 10 bar and/or at a temperature less than 120° C. and/or flowing at a flow rate of between 1 and 1000 m$^3$/h, preferably between 1 and 10 m$^3$/h.

A third aspect relates to a method for measuring a flow rate of a fluid flowing through the measuring system according to the first aspect and/or flowing into the equipment according to the second aspect, comprising:

- an emission of an incident light radiation by the emission module, then
- a transmission, by the optical module, of the incident light radiation from the emission module on the vanes of the rotor, such that the incident light radiation is incident on the vanes of the rotor in a direction substantially perpendicular to the axis of rotation of the rotor, then
- a reflection of the incident light radiation on the vanes of the rotor, then
- a reception, by the optical module, of the reflected radiation, then
- a conversion, by the conversion module, of the reflected radiation so as to determine the rotation speed of the rotor, then to determine the flow rate of the fluid according to the rotation speed of the rotor.

BRIEF DESCRIPTION OF THE FIGURES

The aims, objectives, as well as the features and advantages of the invention will emerge best from the detailed description of an embodiment of the latter, which is illustrated by the following accompanying drawings, in which.

Figure 1:
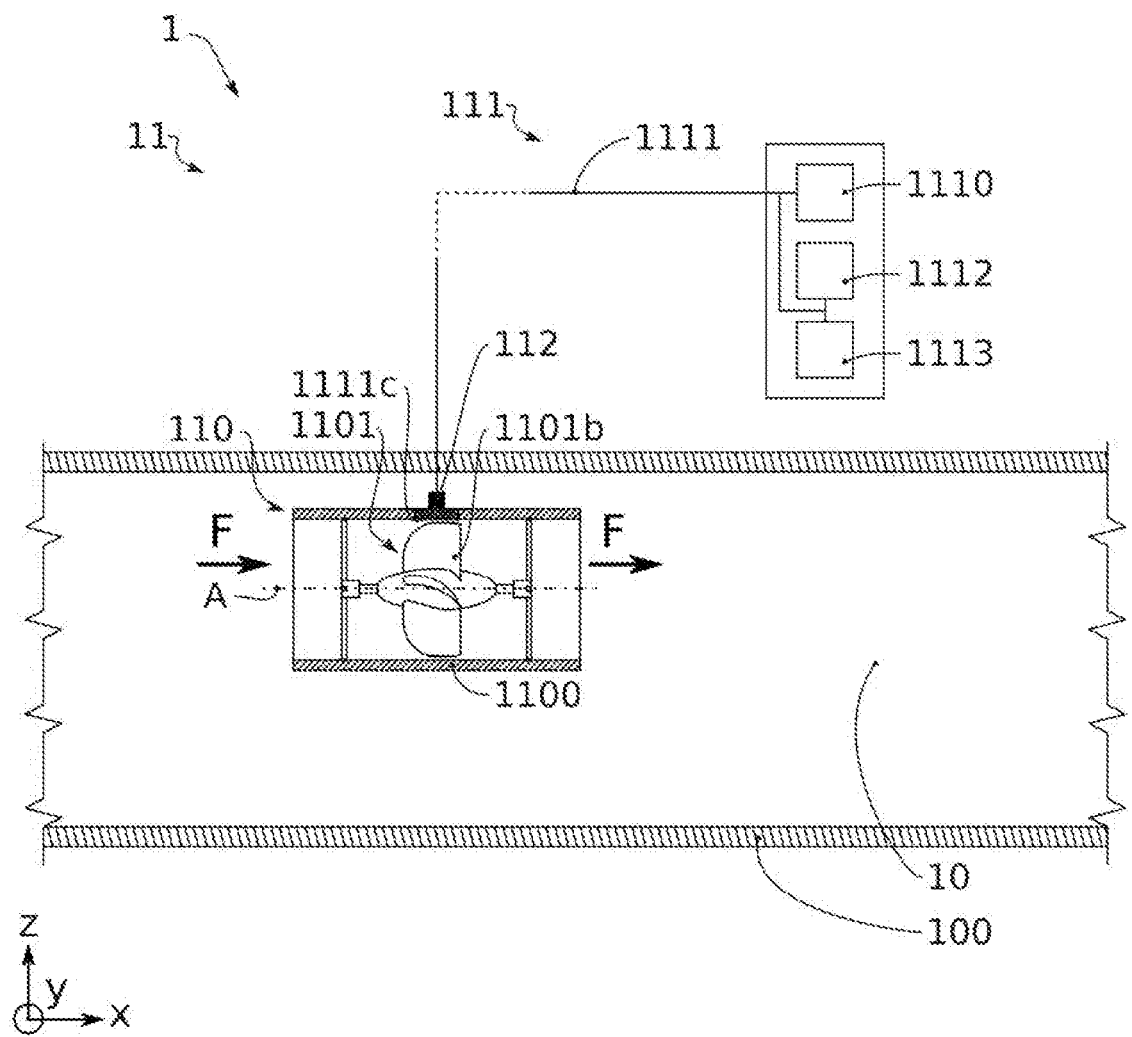
FIG. 1 represents a schematic assembly view of the equipment according to an example of an embodiment of the invention.

The drawings are given as examples and are not limiting of the invention. They constitute principle schematic representations intended to facilitate the understanding of the invention and are not necessarily to the scale of practical applications.

DETAILED DESCRIPTION

Before starting a detailed review of embodiments of the invention, optional features of the measuring system are stated below, which can optionally be used in association or alternatively:
- according to an example, the rotor comprises one single vane having a different reflection coefficient of the light radiation, for example less than at least one other vane,
- according to an example, the rotor comprises one single vane having a reflection coefficient of the light radiation greater than at least one other vane,
- the optical module comprises a transmission portion of the disposed incident light radiation, in the direction substantially perpendicular to the axis of rotation of the rotor, at a distance less than 1 cm, even 5 mm, even 2 mm, of the outer diameter of the rotor. The optical module thus enables a measurement as close as possible to the vanes of the rotor. The accuracy of the measurement of the flow rate is therefore maintained for an inhomogeneous fluid or an opaque fluid, the optical module is configured to be separated from the rotor at least by the fluid. According to an example, the transmission portion of the incident light radiation is disposed, in the direction substantially perpendicular to the axis of rotation of the rotor, at a non-zero distance from the outer diameter of the rotor, the optical module comprises an optical fibre. According to an example, the optical fibre has, between the transmission portion and at least one from among the emission module and the reception module, a length which is adaptable according to the targeted application, for example greater than 0.5 m, even 1 m, the optical module comprises a proximity-detecting optical fibre, the fluid is a liquid. Alternatively, this is a fluid comprising liquid and at least one from among gaseous or solid elements. This can thus be a liquid and solid or liquid and gas mixture, or also liquid and solid and gas, according to an example, the fluid is mainly liquid. In the measuring device, the liquid occupies at least 70% and preferably at least 80% of the volume of the fluid, preferably, the axis is substantially parallel to a main direction, according to which the fluid is intended to flow into the passage, preferably, the body extends, between its inlet and its outlet, mainly in a parallel direction, preferably identical, to the axis of rotation of the rotor, the optical module is configured to transmit the reflected light radiation to the conversion module, for example by way of a reception module, the body has an outer wall configured to be in contact with the flowing fluid. The body can be disposed inside a chamber containing the flowing fluid, only a fraction of the fluid can flow into the passage of the body. The load loss which could be generated by the system is thus reduced, the rotor comprises a plurality of vanes, at least one vane being made of a material having a reflection coefficient of the light radiation less than that of a material constituting the other vanes, the rotor comprises at least four vanes, at least two vanes being made of plastic material and at least two vanes being made of metal, preferably said at least two metal vanes are made of stainless steel, each vane is only made of one material. Thus, the manufacturing of the rotor and therefore of the system is simplified. The reflection difference between the vanes occurs over the whole surface of the vanes on which the radiation is reflected, also improving the accuracy of the measurement of the flow rate, the vanes of the rotor alternatively have distinct reflection coefficients. The modulation of the reflected light radiation thus occurs according to the successive vanes on which the light radiation is reflected, the emission module comprises a laser source. According to this example, the conversion module can comprise a laser interferometer, the optical module comprises an optical fibre comprising a Bragg grating. Thus, the measuring device enables not only a measurement of the flow rate of the fluid, but further a measurement of at least one from among its temperature and its pressure, the emission module is configured to emit an incident light radiation having a wavelength of between 600 and 2000 nm, the system comprises:
at least one pressure sensor configured to measure a parameter relating to a pressure of the fluid flowing in the body. This parameter is, for example, the pressure of the fluid, and/or
at least one temperature sensor, configured to measure a parameter relating to a temperature of the fluid flowing in the body. This parameter is, for example, the temperature of the fluid.

This makes it possible to collect more data on the fluid while preserving a limited bulk and by simplifying the placement and the maintenance of the measuring systems.

It is noted that the measuring method can have any step resulting from the implementation of a feature of the measuring system.

In the present patent application, when it is indicated that two parts are distinct, this means that these parts are separated. They can be:
positioned at distances from one another, and/or
movable against one another, and/or
secured to one another by being fixed by inserts, this fixing being dismountable or not.

A unitary one-piece part cannot therefore be constituted of two distinct parts.

In the detailed description below, use can be made of terms such as "longitudinal" "transverse", "upper", "lower", "top", "bottom", "front", "rear", "inner", "outer". These terms must be interpreted relatively related to the normal position of the equipment and/or of the measuring system. For example, the "longitudinal" direction corresponds to the main extension direction of the actuating module of the measuring system.

Also, a marker will be used, the longitudinal or front/rear direction of which corresponds to the axis x, the transverse or right/left direction corresponds to the axis y and the bottom/top direction corresponds to the axis z.

"Internal" means the elements or the faces rotated inwards from the equipment and/or from the measuring system, and "external" means the elements or the faces rotated outwards from the equipment and/or from the measuring system.

By a parameter "substantially equal to/greater than/less than" a given value, this means that this parameter is equal to/greater than/less than the given value, plus or minus 10%, even plus or minus 5%, of this value.

In the present patent application, it is considered that the fluid is liquid when the fluid is at least partially, even totally, in the liquid state. It is not therefore excluded that the fluid is partially in the gaseous state, nor that the fluid comprises a solid fraction.

The equipment 1 is now detailed in reference to FIG. 1. The equipment comprises a chamber 10. The chamber 10 is configured to contain a fluid comprising flowing liquid. The chamber 10 is at least partially, even totally, delimited from a wall 100. The chamber is, for example, a tank or a conduit.

The flowing fluid can form a severe condition environment, for example in terms of pressure, temperature, nature of the fluid. According to an example, the fluid can further be corrosive. According to an example, the fluid is subjected to pressure and temperature conditions, such that the fluid is at least partially, even totally, in the liquid state. The equipment 1 and, in particular, the chamber 10 can be configured to contain a pressurised and/or high temperature fluid. The equipment 1 can be configured such that the fluid is at a temperature substantially between the melting point of the fluid, under the pressure conditions of the chamber 10, and 350° C., even between the melting point of the fluid, under the pressure conditions of the chamber 10, and 120° C. The equipment 1 can be configured such that the fluid is at a sufficient pressure to maintain the fluid at least partially liquid. The pressure of the fluid can further be substantially less than 200 bar, even less than 155 bar. According to an example, the pressure of the fluid can further be substantially less than 10 bar. The equipment 1 can be configured such that the fluid flows at a flow rate of between 1 and 1000 m$^3$/h, preferably between 0.1 and 5 m$^3$/h.

For example, the chamber 10 of the equipment 1 is a channel for petrochemical applications such as a petrochemical fluid circulation channel. According to another example, the chamber 10 is a conduit in which a solvent, a reagent, or a product circulates in chemistry, pharmacy, or agribusiness equipment 1. According to an example, the chamber 10 is a conduit of a building, such as a water supply conduit or an effluent discharge conduit.

The equipment further comprises a system 11 configured to measure at least the flow rate of the flowing fluid. For this, and as illustrated in the functional diagram 2, the system 11 comprises an actuating module 110, configured to be driven by the flow of the fluid, represented by the arrows F in FIG. 1. The actuating module 110 comprises a body 1100 in which the fluid flows, for example in the longitudinal direction x. The actuating module 110 further comprises at least one rotor 1101 disposed inside the body 1100. The rotor 1101 is configured to be rotated about the axis A. The axis of rotation A is substantially parallel to the flow direction x in the body 1100.

The system 11 further comprises a device for measuring 111 the rotation speed of the rotor 1101. The measuring device 111 is configured to optically determine the rotation speed of the rotor 1101. For this, and as illustrated in the functional diagram 2, the measuring device 111 can comprise a module for emitting 1110 a light radiation, an optical module 1111, a module for receiving 1112 the light radiation and conversion module 1113.

Figure 3A:
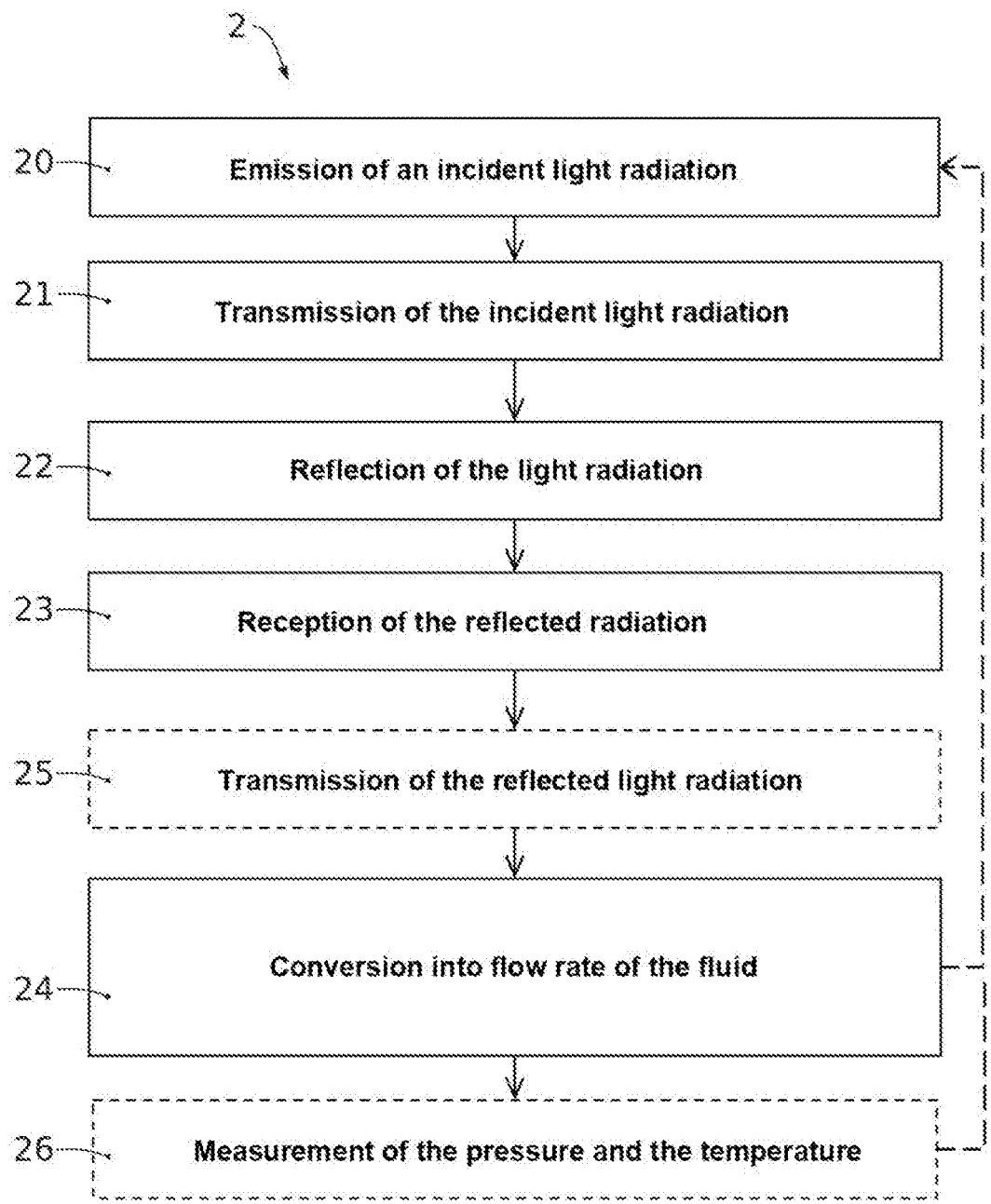
FIGS. 3A and 3B illustrates, in a simplified manner, the steps of a method for measuring the flow rate of a fluid according to different examples of embodiments of the invention.
Figure 3B:
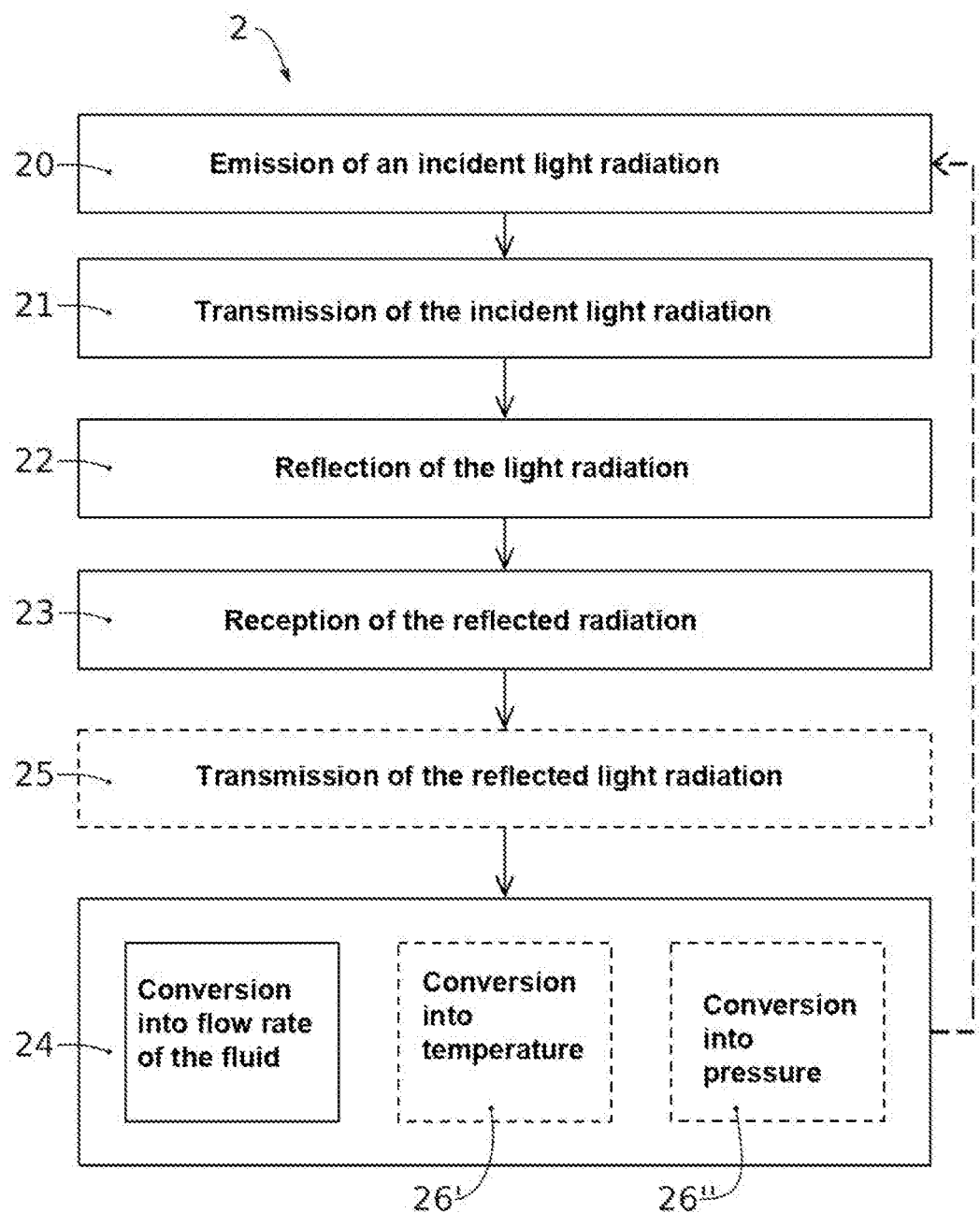

The functioning kinetics of the system 11 and the method 2 for measuring the flow rate of the fluid are now described relative to FIGS. 1, 3A and 3B. In FIGS. 3A and 3B, optional steps are indicated in a dotted line, and are subsequently described. The emission module 1110 emits 20 a so-called incident light radiation. The optical module 1111 is configured to transmit 21 the incident light radiation from the emission module 1110 to the actuating module 110, and more specifically, to the rotor 1101 rotated by the fluid.

At the rotor 1101, the incident light radiation is reflected 22 on the vanes 1101b of the rotor 1101. The optical module 1111 is configured to receive the reflected light radiation. The optical module 1111 can then transmit 25 the reflected light radiation to the conversion module 1113. This transmission 25 can be done by way of the reception module 1112, configured to transform the reflected light radiation into a corresponding physical signal, for example, an electrical signal. The conversion module 1113 can comprise the reception module 1112.

The reflected light radiation is modulated according to the rotation of the vanes 1101b about the axis A. For example, the intensity of the reflected light radiation is modulated by the rotation of the vanes 1101b. The conversion module 1113 is configured to convert the reflected radiation, or the corresponding physical signal, into a number of rotations of the rotor 1101 per time unit, which corresponds to the rotation speed of the rotor 1101. According to the rotation speed of the rotor 1101, the conversion module 1113 is configured to determine the flow rate of the fluid. The conversion module 1113 thus makes it possible to convert 24 the reflected radiation into fluid flow rate.

The optical module 1111 is configured such that the incident light radiation is incident on the vanes 1101b of the rotor 1101 in a direction z substantially perpendicular to the axis A of rotation of the rotor 1101. The optical module 1111 can comprise a transmission portion 1111c of the incident light radiation, configured to transmit the incident light radiation of the optical module 1111 to the actuating module 110.

The transmission portion 1111c can enable the passage of the incident radiation and of the reflected radiation to the optical module 1111. The transmission portion 1111c can extend in the direction z substantially perpendicular to the axis A of rotation of the rotor 1101. The bulk of the optical module 1111 is minimised in the direction x. Thus, the load losses in the flow of the fluid are minimised. The measuring system therefore enables an accurate and reliable measurement of the flow rate of the fluid, and in particular an accuracy less than 1% of the value to be measured.

The relative arrangement of the different modules of the system 11 is now described. The body 1100 of the actuating module 110 can be disposed in the continuity, even form an integral part, of the wall 100 of the chamber 10. For this, each end of the body 1100 can comprise a portion for connecting to the wall 100 of the chamber 10, configured to channel the fluid from the chamber 10 into the passage defined by the body 1100 and/or form a junction which is fluidically sealed between the wall 100 of the chamber 10 and the passage defined by the body 1100.

Preferably, the body 1100 is distinct from the wall 100 of the chamber 10. The body 1100 can have an outer wall 1100d configured to be in contact with the flowing fluid. Thus, the actuating module 110 and therefore the body 1100, as well as the rotor 1101 are immersed, preferably fully immersed, inside the fluid contained in the chamber 10. As illustrated in FIG. 1, the actuating module 110 can be disposed inside the chamber 10 containing the flowing fluid. The system is therefore adapted to measure the flow rate of a fluid in current equipment 1. According to an example, the body 1100 defines a volume less than 1/3, even 1/5, even 1/10 of a volume delimited by the inner wall of the chamber, over a length equal to that of the body 1100 in the direction x. When the body 1100 is distinct from the wall 100 of the chamber 10, the ends of the body 1100 can have no portions for connecting to the wall 100 of the chamber 10, these connection portions being configured to channel the fluid from the chamber 10 into the passage defined by the body 1100, and/or form a fluidically sealed junction between the wall 100 of the chamber 10 and the passage defined by the body 1100.

According to an example, the actuating module 110 is removably mounted manually or by way of tools on the chamber 10. The actuating module 110 can be mounted on a wall 100 of the chamber 10, or on any part of the equipment 1 disposed in the chamber 10. Thus, the actuating module 110 can be introduced and removed if needed from the chamber 10. Once the module 110 is removed, for example for maintenance, the chamber 10 can preserve its integrity. Only a fraction of the fluid can further flow in the body 1100. The load loss which could be generated by the system 11 is thus further reduced. The impact of the measurement on the flow of the fluid is further minimised.

According to an example, the optical module 1111 comprises a waveguide, and more specifically, an optical fibre 1111a. As illustrated in FIG. 1, the optical fibre 1111a can extend between the transmission portion 1111c and the emission module 1110. The optical fibre 1111a can extend between the transmission portion 1111c and at least one from among the reception module 1112 and the conversion module 1113. The optical fibre 1111a makes it possible to offset the emission module 1110 and the conversion module 1113 of the rotor 1101 on which the measurement is taken. The system 11 is therefore adapted to measuring the flow rate of a fluid in an environment having a limited geometry. The system 11 is further adapted to measuring the flow rate of a fluid in a severe condition environment, by avoiding a possible damaging of the emission module 1110, of the reception module 1112 and of the conversion module 1113. The transmission portion 1111c is preferably disposed at the distal end of the optical fibre 1111a. The optical fibre 1111a can have an adaptable length according to the targeted application between the transmission portion and: the emission module 1110, and/or the reception module 1112, and/or the conversion module 1113, for example greater than 0.5 m, or even 1 m.

Figure 4:
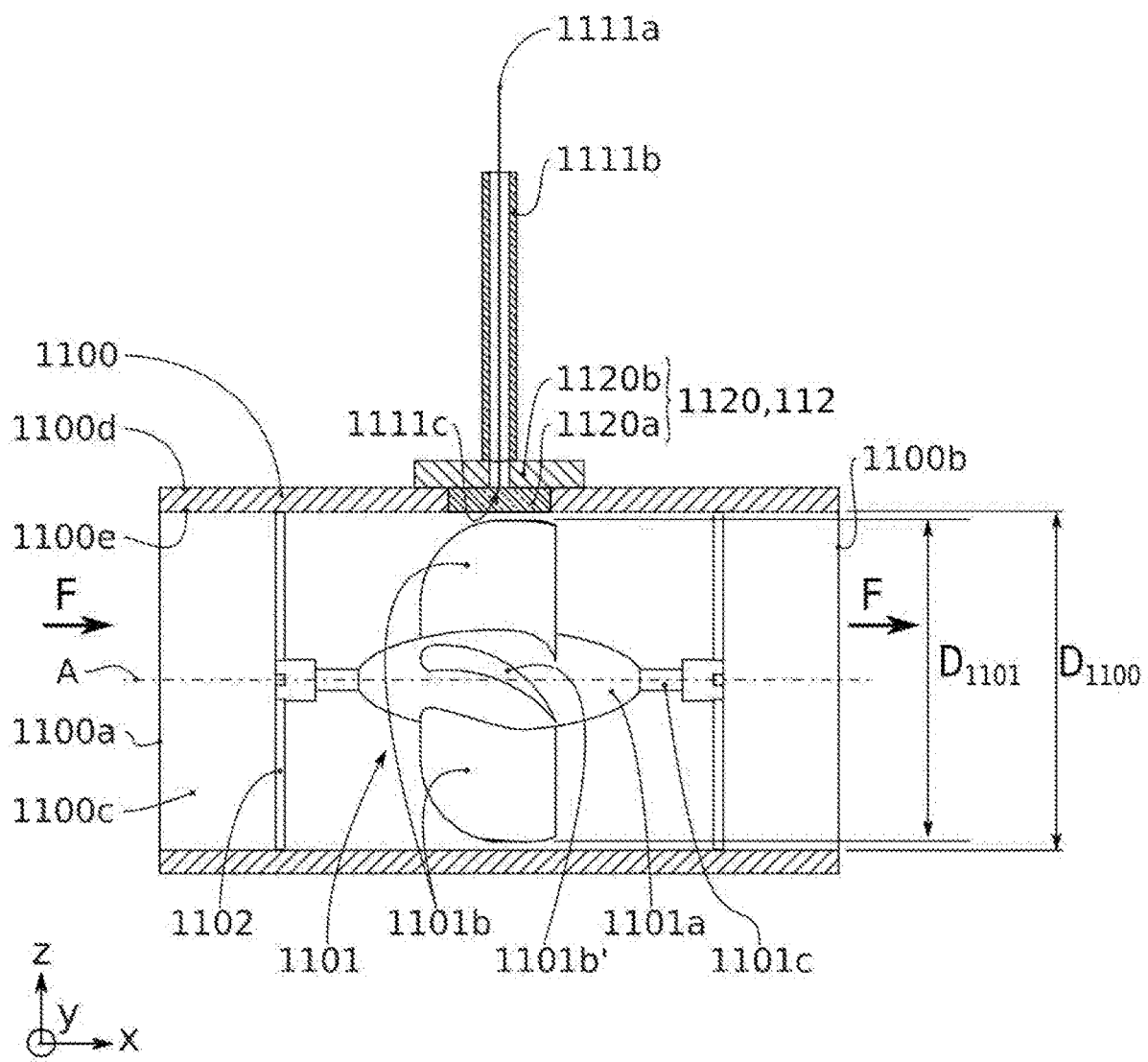
FIG. 4 represents a longitudinal cross-sectional view of the actuating module of the measuring system illustrated in FIG. 1.

As illustrated in FIG. 4, the optical fibre 1111a can be disposed inside a sheath 1111b, also called hollow cable, connecting the actuating module 110 to the emission module 1110 and/or to the reception module 1112 and/or to the conversion module 1113, even to the assembly formed by these three modules. Preferably, the sheath 1111b is configured to avoid a local folding of the optical fibre 1111a. As illustrated in FIG. 1, when the actuating module 110 is disposed inside the chamber 10, the sheath 1111b can be disposed perpendicularly to the flow direction of the fluid, between the wall 100 of the chamber and the actuating module 110. The sheath 1111b can be chosen to be slightly deformable in the flowing fluid, in particular according to the temperature and the pressure of the fluid. Preferably, the sheath 1111b is fluid sealed. For example, the sheath 1111b comprises at least one metal layer or is made of metal, preferably stainless steel.

The measuring device 111 can further comprise a connection module 112 configured to ensure a sealed junction 1120 between the fluid and the optical module 1111. The sealed junction 1120 makes it possible to avoid the fluid penetrating into the optical module 1111. As illustrated in FIG. 4, the sealed junction 1120 can comprise a first part 1120a, disposed between the optical module 1111 and the fluid flowing in the body 1100 of the actuating module 110. This first part 1120a can, in particular, be disposed between the transmission portion 1111c of the optical module 1111 and the rotor 1101, on the optical path of the light radiation. This first part 1120a is therefore transparent to the light radiation used. The material of the first part 1120a can vary according to the temperature of the fluid. For example, for a temperature of the heat transfer fluid substantially less than 100° C., the first part 1120a of the sealed junction 1120 can be glass-based or made of glass. According to another example, for a temperature of the heat transfer fluid substantially between 100° C. and 500° C., the first part 1120a of the sealed junction 1120 can be sapphire-based or made of sapphire. The thickness of the first part 1120a can be adapted according to the pressure difference between the fluid flowing inside the body 1100 and the optical module 1111. The first part 1120a of the sealed junction 1120 can more specifically be configured to be adapted to a pressure of the fluid up to substantially 600 bar. The sealed junction 1120 can comprise a second part 1120b. This second part 1120 can be disposed between the body 1100 and the sheath 1111b such that the fluid circulating outside of the body 1100 does not penetrate into the optical module 111. For example, this second part is made of stainless steel.

Figure 5:
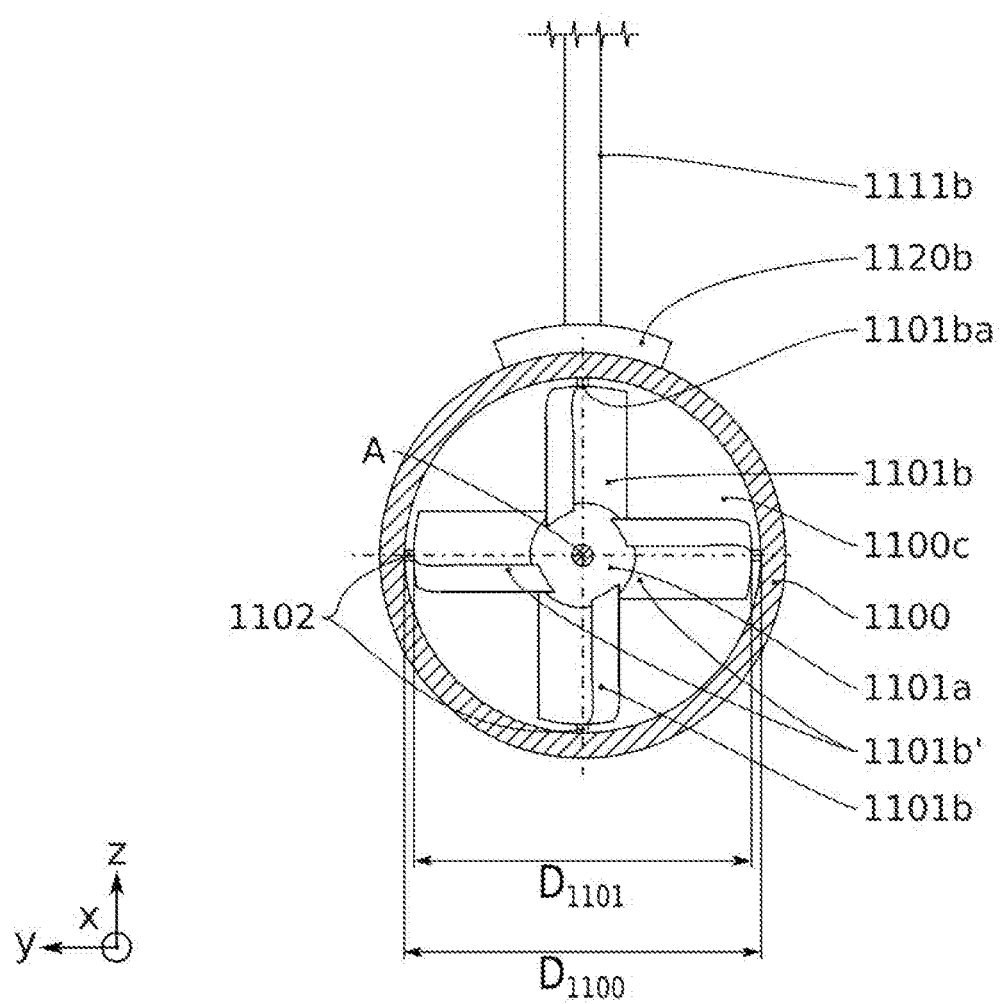
FIG. 5 represents a transverse cross-sectional view of the actuating module of the measuring system illustrated in FIG. 4.

The actuating module 110 and its cooperation with the optical module 1111 are now described in more detail in reference to FIGS. 4 and 5. The body 1100 has at least one inlet 1100a and at least one outlet 1100b. It further has at least one passage 1100c for the flow of the fluid from the inlet 1100a to the outlet 1100b. The body 1100 can be disposed such that the passage 1100c is substantially parallel to the flow direction x of the fluid in the chamber 10, such that measuring the flow rate is as reliable as possible.

The body 1100 further has a passage opening of the optical module 1111. The transmission portion 1111c of the optical module 1111, and/or the first part 1120a of the sealed junction 1120, can be disposed in this opening, so as to be flush with the inner face 1100e of the body 1100. Thus, the optical module 1111 is disposed as close as possible to the rotor 1101 without penetrating into the passage 1100c of the fluid. A possible offsetting or a possible deformation of the transmission portion 1111c with respect to the rotor 1101 is avoided. The optical path of the light radiation is thus not impacted by the flow of the fluid. Furthermore, the inner hydraulic diameter of the body 1100 is thus not modified. The profile of the flow in the body 1100 is not disrupted by the optical module 1111.

The actuating module 110 comprises at least one rotor 1101, and preferably one single rotor 1101, preferably one-piece. Thus, the bulk of the rotor 1101 in the flow direction x of the fluid is minimised, which further minimises the load losses in the fluid. The rotor 1101 comprises a hub 1101a extending along the axis of rotation A, substantially parallel to the flow direction x of the fluid. The hub 1101a can be mounted on a shaft 1101c. The shaft 1101c can be mounted on a support 1102 extending at least from one point to another of the inner face 1100e of the body 1100. In a cutting plane (y, z) of the support 1102, the support 1102 preferably occupies a fraction less than 50%, even less than 70%, even less than 85% of the surface of the passage 1100c. Thus, the support minimises a load loss of the fluid during its passage in the actuating module 110.

The rotor 1101 comprises a plurality of vanes 1101b, 1101b' extending radially to the axis of rotation A. The transmission portion 1111c and/or the first part 1120a of the sealed junction 1120, are disposed in the direction z perpendicular to the axis of rotation A of the rotor 1101, at a distance less than 1 cm, even 5 mm, even 1 mm, from the outer diameter of the rotor 1101, preferably non-zero. When the fluid is inhomogeneous, the passage of solid particles between the transmission portion 1111c and the end 1101ba of the vanes 1101b, 1001b' is thus limited, as for example illustrated in FIG. 5. The risk that a solid particle disrupts the passage of the light radiation is limited. Furthermore, when the fluid is opaque, this distance ensures the passage of the light radiation between the transmission portion 1111c and this end 1101ba. The accuracy of measuring the flow rate is therefore maintained even for an opaque fluid. It is considered that a fluid is opaque at a given wavelength when more than 70% of the light power of the incident radiation is absorbed by the fluid over a thickness of 5 mm.

According to an example, the outer diameter $D_{1101}$ of the rotor 1101, defined by the rotation of the distal ends 1101ba of the vanes 1101b, 1101b', can be determined by the following relationship:

$D_{1101} = D_{1100} - d$, with $D_{1100}$ the inner diameter of the body 1100 and d a distance, preferably non-zero, less than 1 cm, preferably less than 5 mm, and more preferably also, 2 mm.

It is noted that the features of the rotor 1101 can further be chosen according to the flow rate range of the fluid to be measured. These features can, for example, be the longitudinal dimension of the rotor 1101, and/or the number of vanes 1101*b*, 1101*b'*.

According to an example, the rotor 1101 comprises vanes 1101*b*, 1101*b'*, at least one vane 1101*b* being made of a material distinct from one or other vanes 1101*b'* or covered with a coating different from the coating or of the material of one or other vanes 1101*b'*. According to an example, at least one vane is made of a material distinct from a material constituting the other vanes and has a different reflection coefficient of the light radiation, for example, less than the material constituting the other vanes.

According to an example, the assembly of the at least one vane 1101*b* is made of a material distinct from a material constituting the assembly of the at least one other vane, which has a different reflection coefficient of the light radiation, for example, less than the material constituting the at least one other vane. According to an alternative example, at least one vane is coated with a coating different from a coating and/or with a material of the at least one other vane, so as to have a different reflection coefficient of the light radiation, for example, less than the material constituting the at least one other vane.

Each vane can more specifically be made only of one material. Thus, the manufacturing of the rotor and therefore of the system is simplified. According to an example, at least one vane can have a different reflection coefficient of the light radiation, less than or greater than that of at least one other vane. According to an example, at least one vane can be made of a material having a reflection coefficient of the light radiation less than that of the material constituting the other vanes. The reflection coefficient can be defined by the ratio of the intensity of the reflected light radiation and the intensity of the incident light radiation. Thus, the light beam has a more or less significant reflection according to the vanes, for example according to the material constituting the vanes. The reflected light radiation is therefore modulated according to the vanes on which it is reflected, which facilitates the determination of the number of rotations/time unit of the rotor. The accuracy of measuring the flow rate can therefore thus be further improved.

When each vane 1101*b*, 1101*b'* is only made of one material or is fully coated by the coating, the reflection difference between the vanes 1101*b* occurs over the whole surface of the vanes on which the radiation is reflected. The determination of the number of rotations/time unit of the rotor 1101 is even more facilitated, further improving the accuracy of measuring the flow rate. The materials of distinct reflection coefficients can be metal, magnetic or not, preferably stainless steel and plastic.

According to an example, the vanes 1101*b*, 1101*b'* of the rotor 1101 have alternatively distinct reflection coefficients, for example they are alternatively made of materials having distinct reflection coefficients. Equally, for a vane 1101*b* having a reflection coefficient, the vane(s) 1101*b'* directly adjacent have a distinct reflection coefficient. The modulation of the reflected light radiation occurs according to the successive vanes 1101*b*, 1101*b'* on which the light radiation is reflected, which further facilitates the determination of the number of rotations/time unit of the rotor. For example, for a rotor comprising four vanes, two opposite vanes 1101*b'* with respect to the axis of rotation of the rotor can have a first reflection coefficient, for example by being made of a first material, and the two other opposite vanes 1101*b* with respect to the axis of rotation of the rotor can have a second reflection coefficient, for example by being made of a second material, the first and the second material having distinct reflection coefficients.

According to an example, the rotor 1101 comprises at least two vanes 1101*b'* made of plastic material and at least two vanes 1101*b* made of metal, magnetic or not, and preferably made of stainless steel. Thus, the light beam has a maximum reflection on the metal vanes, and a lesser reflection on the plastic material vanes. The reflected light radiation is therefore modulated according to the vanes on which it is reflected, which facilitates the determination of the number of rotations/time unit of the rotor.

Examples of embodiments of the measuring device 111 are now detailed. According to an example, the emission module 1110, the optical module 1111 and the reception module 1112 can be configured to detect, by proximity, the rotation of the rotor 1101. In the detection by proximity, the emission module 1110 and the reception module 1112 are adjacent. The light radiation is reflected by a reflector. When the vanes 1101*b*, 1101*b'* of the rotor 1101 cut the beam, the radiation reflected on the vanes makes it possible to detect the rotation speed of the vanes 1101*b*, 1001*b'*. For this, the optical fibre 1111*a* can be a proximity optical fibre. The light radiation can have a wavelength belonging to the infrared range. The scope of the light radiation in the fluid is thus a few mm.

The emission module 1110 can be configured to emit an incident light radiation having a wavelength of between 600 and 2000 nm. With respect to other wavelength ranges, the light sources of the red or of the near infrared are inexpensive, while offering a sufficient accuracy for measuring the flow rate.

According to an example, the emission module 1110 comprises a laser source. According to this example, the conversion module 1113 comprises a laser interferometer. The laser source emits a temporally coherent radiation enabling the detection of the rotation of the rotor 1101 by interferometry. In a manner known in the field, interferometry is a measurement using the interference phenomenon of the waves. The resulting interference fringes give information on the length of the optical path travelled. This technique has the advantage of being accurate, while limiting the cost of the measuring system 11.

Figure 2:
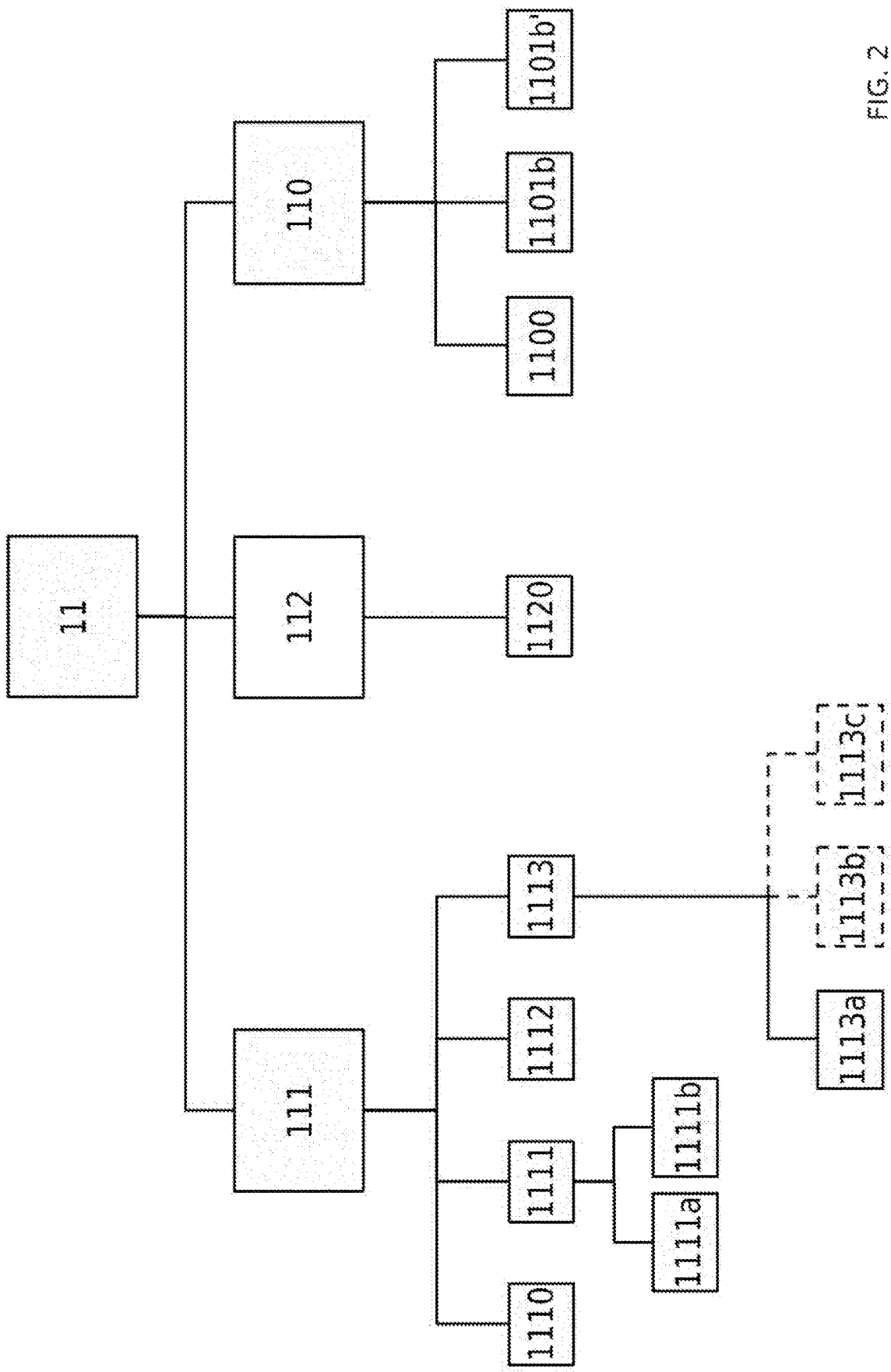
FIG. 2 represents a functional diagram of the measuring system according to an example of an embodiment of the invention.
Figure 6:
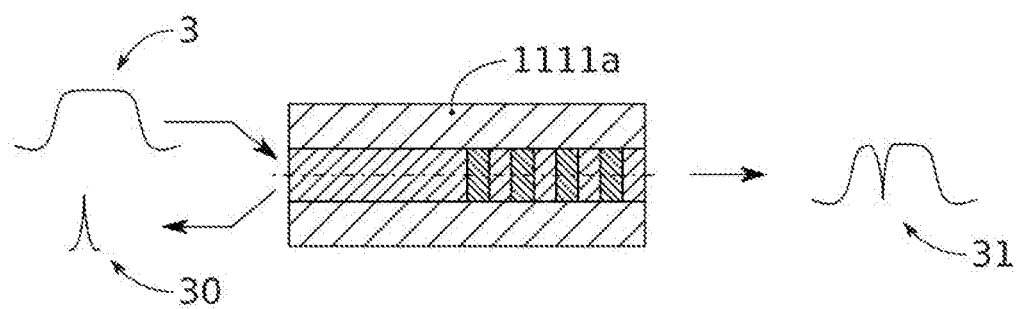
FIG. 6 represents the operating principle of an optical fibre comprising a Bragg grating.

According to an alternative example, the optical fibre 1111*a* can comprise a Bragg grating. Thus, the measuring device 111 enables not only a measurement of the flow rate of the fluid, but further a measurement of its temperature and/or of its pressure. The operation of a Bragg grating optical fibre is described as an example by FIG. 6. The reflected radiation 3 coming from the vanes 1101*b* of the rotor 1101 can penetrate into the optical fibre 1111*a* by the transmission portion 1111*c*. According to the parameters of the Bragg grating in the optical fibre 1111*a*, at least one wavelength, called Bragg wavelength 30, is reflected by the grating and emerges from the fibre through the transmission portion 1111*c*. The light signal exiting from the Bragg grating 31 is therefore constituted of the reflected radiation 3 to which the at least one Bragg wavelength has been subtracted. The temperature and the pressure of the fluid can vary the parameters of the Bragg grating, for example by dilatation or deformation, and therefore the light signal 31 obtained. The dilatation or deformation of the Bragg grating extends, in this case, from the effect of the temperature and of the pressure of the fluid on the Bragg grating, and not from a mechanical deformation induced by the rotation of the rotor. It is, in particular, the case when the optical module 1111 is configured to be separated from the rotor 1101 at least by the fluid. As illustrated in a dotted line in FIG. 2, the conversion module 1113 can comprise a means for converting the flow rate 1111a, as well as means for converting the temperature 1113b and the pressure 1113c. As illustrated in FIG. 3B, the method for measuring the flow rate of the fluid can further comprise a conversion of the reflected radiation into temperature and/or into pressure of the fluid.

With an optical fibre comprising a Bragg grating, the spectral width of the light radiation can be substantially between a few nm and several thousand nm.

It is noted that it can be provided that the measuring device 111 comprises pressure and/or temperature sensors, for example additional to the optical module 1111. As illustrated in FIG. 3A, the method for measuring the flow rate of the fluid can further comprise a measurement of the temperature and/or of the pressure of the fluid.

The method for measuring the flow rate of the fluid can further comprise a calibration of the measuring system prior to its use. For example, this calibration can be done specifically under the conditions of use of the measuring system 11 in the equipment 1.

In view of the description above, it appears clearly that the invention proposes a system for measuring the flow rate of a fluid comprising liquid, improved with respect to the current solutions, and in particular, of which the accuracy and the reliability of measuring the flow rate are increased with respect to the current solutions.

LIST OF NUMERICAL REFERENCES

1 Equipment
10 Chamber
100 Walls of the chamber
11 System for measuring the flow rate
110 Actuating module
1100 Body
1100a Inlet
1100b Outlet
1100c Passage
1100d Outer wall
1100e Inner wall
1101 Rotor
1101a Hub
1101b Vane
1101ba Distal end
1101b' Vane
1101c Shaft
1102 Support
111 Measuring device
1110 Emission module
1111 Optical module
1111a Optical fibre
1111b Sheath
1111c Transmission portion
1112 Reception module
1113 Conversion module
1113a Submodule for converting the flow rate
1113b Submodule for converting the temperature
1113c Submodule for converting the pressure
112 Connection module
1120 Sealed junction
1120a First part
1120b Second part
2 Measuring method
20 Emission of an incident light radiation
21 Transmission of the incident light radiation
22 Reflection of the light radiation
23 Reception of the reflected light radiation
24 Conversion into fluid flow rate
25 Transmission of the reflected light radiation
26 Measuring the pressure and the temperature
26 Conversion into temperature
26" Conversion into pressure
3 Reflected radiation
30 Bragg radiation
31 Light signal exiting from the Bragg grating

The invention claimed is:

1. A system for measuring a flow rate of a fluid comprising liquid, comprising:
a body comprising at least one inlet, at least one outlet, and at least one passage for a flow of the fluid from the inlet to the outlet;
at least one rotor disposed inside the at least one passage and configured to be rotated, by the flow of the fluid, about an axis substantially parallel to a main direction according to which the fluid is intended to flow into the passage; and
a device for measuring a rotation speed of the rotor, the measuring device comprising
a module for emitting an incident light radiation,
an optical module configured to
transmit the incident light radiation from the emission module on vanes of the rotor, and
receive a reflected light radiation, the reflected light radiation coming from a reflection, on the vanes of the rotor, of the incident light radiation, and
a conversion module configured to
determine the rotation speed of the rotor according to the reflected light radiation, and
determine the flow rate of the fluid according to the rotation speed of the rotor, wherein the optical module is configured such that the incident light radiation is incident on the vanes of the rotor in a direction substantially perpendicular to the axis of rotation of the rotor,
the measuring device further comprises a module for connecting the optical module to the body, the connection module being configured to establish a fluid seal junction between the optical module and the passage, and
the rotor comprises a plurality of vanes, at least one vane of the plurality of vanes having a reflection coefficient of a light radiation different from a reflection coefficient of the light radiation of at least one other vane of the plurality of vanes.

2. The system according to claim 1, wherein the optical module comprises a portion for transmitting the disposed incident light radiation in the direction substantially perpendicular to the axis of rotation of the rotor, at a distance less than 1 cm from an outer diameter of the rotor.

3. The system according to claim 2, wherein the distance is less than 5 mm from the outer diameter of the rotor.

4. The system according to claim 3, wherein the distance is less than 2 mm from the outer diameter of the rotor.

5. The system according to claim 1, wherein the optical module comprises an optical fibre.

6. The system according to claim 5, wherein the optical module comprises a proximity detection optical fibre.

7. The system according to claim 1, wherein the optical module is configured to transmit the reflected light radiation to the conversion module.

8. The system according to claim 1, wherein the body has an outer wall configured to be in contact with the flowing fluid.

9. The system according to claim 1, wherein the at least one vane is made of a material having a reflection coefficient of the light radiation less than a reflection coefficient of the light radiation of a material constituting the at least one other vane.

10. The system according to claim 9, wherein the rotor comprises at least four vanes, at least two vanes of the at least four vanes being made of plastic material and at least two other vanes of the at least four vanes being made of metal.

11. The system according to claim 1, wherein the emission module comprises a laser source, and the conversion module comprises a laser interferometer.

12. The system according to claim 1, wherein the optical module comprises an optical fibre comprising a Bragg grating.

13. The system according to claim 1, wherein the emission module is configured to emit the incident light radiation having a wavelength of between 600 and 2000 nm.

14. The system according to claim 1, comprising at least one of:
- at least one pressure sensor configured to measure a parameter relating to a pressure of the fluid flowing in the body, and
- at least one temperature sensor, configured to measure a parameter relating to a temperature of the fluid flowing in the body.

15. An equipment comprising a chamber configured to contain a fluid comprising flowing liquid, and the system for measuring a flow rate of the fluid comprising liquid according to claim 1, the chamber being delimited by a wall distinct from the body of the measuring system.

16. The equipment according to claim 15, wherein the chamber is configured to contain the fluid comprising liquid at a pressure less than 200 bar, at a temperature less than 350° C. and flowing at a flow rate of between 1 and 1000 m$^3$/h.

17. The equipment according to claim 16, wherein the chamber is configured to contain the fluid comprising liquid at the pressure less than 10 bar and at the temperature less than 120° C.

* * * * *